United States Patent [19]

Berringer

[11] 4,146,430
[45] Mar. 27, 1979

[54] NUCLEAR REACTOR CORE FLOW BAFFLING

[75] Inventor: Robert T. Berringer, Gulf Breeze, Fla.

[73] Assignee: Westinghouse Electric Corp., Pittsburgh, Pa.

[21] Appl. No.: 635,026

[22] Filed: Nov. 25, 1975

[51] Int. Cl.$^2$ .............................................. G21C 9/00
[52] U.S. Cl. ....................................... 176/61; 176/65; 176/87
[58] Field of Search ........................ 176/61, 87, 37, 38

[56] References Cited

U.S. PATENT DOCUMENTS

| 3,205,144 | 9/1965 | Jabsen | 176/50 |
| 3,607,637 | 9/1971 | Marshall | 176/61 |
| 3,785,924 | 1/1974 | Notari | 176/61 |
| 3,821,079 | 6/1974 | Jabsen | 176/61 |
| 3,823,066 | 7/1974 | Thome | 176/66 |
| 3,868,302 | 2/1975 | Singleton | 176/87 |
| 3,943,036 | 3/1976 | Ziegler | 176/18 |

FOREIGN PATENT DOCUMENTS

1948901 4/1971 Fed. Rep. of Germany ............. 176/40

*Primary Examiner*—Samuel W. Engle
*Assistant Examiner*—Ralph Palo
*Attorney, Agent, or Firm*—Edward L. Levine; Z. L. Dermer

[57] ABSTRACT

A flow baffling arrangement for the core of a nuclear reactor. A plurality of core formers are aligned with the grids of the core fuel assemblies such that the high pressure drop areas in the core are at the same elevations as the high pressure drop areas about the core periphery. The arrangement minimizes core bypass flow, maintains cooling of the structure surrounding the core, and allows the utilization of alternative beneficial components such as neutron reflectors positioned near the core.

2 Claims, 12 Drawing Figures

NUCLEAR REACTOR CORE FLOW BAFFLING

CROSS-REFERENCES TO RELATED APPLICATIONS

Reference is made to the following applications, assigned to the Westinghouse Electric Corporation and filed concurrently herewith:

1. Application filed in the name of R. T. Berringer and O. J. Machado, entitled "Baffle-Former Arrangement For Nuclear Reactor Vessel Internals", Ser. No. 635,025, herein referred to as the first Berringer/Machado application. The first Berringer/Machado application may be referred to for a better understanding of some of the deficiencies of prior art core baffling arrangements. This invention provides an alternative baffling arrangement to that of the first Berringer/Machado application.

2. Application filed in the name of R. T. Berringer and O. J. Machado, entitled "Nuclear Core Region Fastener Arrangement", Ser. No. 635,024, herein referred to as the second Berringer/Machado application. The second Berringer/Machado application may be referred to for a better understanding of additional deficiencies of prior art core baffling arrangements. This invention may also be advantageously utilized in conjunction with some of the inventive concepts of the second Berringer/Machado application.

3. Application filed in the name of F. W. Cooper et al. entitled "Nuclear Core Baffling Apparatus", Ser. No. 635,023, herein referred to as the Cooper et al. application. The Cooper et al. application may be referred to for a better understanding of baffling arrangements and thermal expansions. This invention provides an alternative baffling arrangement to that of the Cooper et al. application.

BACKGROUND OF THE INVENTION

1. Field of the Invention

This invention relates to the reactor vessel internals of a nuclear reactor, and more particularly to apparatus which baffles flow through and about the core of a reactor.

2. Description of the Prior Art

A typical liquid cooled nuclear reactor includes a singular reactor vessel, housing the heat generating reactor core, and a plurality of flow loops through which the reactor coolant fluid is circulated. In each loop, coolant which is heated in the core typically is placed in heat exchange relation with a vaporizable fluid which is used to drive turbine-generator apparatus. The coolant is then recirculated to the reactor vessel. Within the vessel are the reactor vessel internals, the functions of which include support of the core components, such as the fuel assemblies, guidance of reactor coolant flow, and support of core monitoring apparatus. Most of the supported load is transmitted through the wall of a massive core barrel which is spaced from and radially surrounds the reactor core. The main stream of coolant flow generally enters the vessel, passes downward in an annulus formed between the barrel and vessel, and then is turned 180° to flow up through the core and out of the vessel.

In the annular region between the core fuel assemblies and the core barrel is typically located a baffle plates and formers assembly. The baffle plates vertically extend the height of the core, and are positioned adjacent the core outer periphery, so as to enclose and baffle coolant flow through the core. The plates are supported by a plurality of horizontal formers, which are affixed to and supported by the core barrel. In addition to baffling flow through the core, the baffle-former assembly must be positioned close to the peripheral fuel assemblies to maintain a minimum amount of flow in this relatively low power region. If too large a flow area exists, it will detract from the thermal efficiency of the reactor as it bypasses the core and mixes with hot coolant. The baffle-former assembly also provides a coolant containing annular region between the core and the core barrel which shields the barrel from irradiation. Coolant which has entered the vessel, but which has not passed through the core, flows through this annular region. This flow cools the baffles, formers, the core barrel, and the fasteners affixing these components. It is also important that bypass flow through this area not be so large as to unduly reduce reactor thermal efficiency.

There are, however, problems associated with the baffle-former assemblies typically in use. First, the core barrel is typically a relatively thick walled structure due to the massive loads it must support, as compared to the relatively thin walled baffle plates which are not similar load-bearing structures. As a result of temperature changes with changes in core power and power distribution changes throughout an operating cycle, and the thermal gradient between the baffle plates and the core barrel, extremely high loads are placed upon the connecting formers and fasteners due to the differential thermal expansion of the components. The accommodation of the loads in the fasteners, such as bolts or welds, has been unsatisfactory, as discussed in the referenced second Berringer/Machado application.

Second, under assumed and highly unlikely accident conditions, such as a major rupture of the reactor primary system, the reactor will rapidly depressurize. However, the core area will depressurize faster than the baffle-former annular region, potentially resulting in a pressure buildup that could fail the baffle assembly and subsequently the fuel assemblies. This is discussed in more detail in the referenced first Berringer/Machado application.

Third, because the baffle plates are subject to high heat loads and differential expansions, they are not affixed, and merely abut against one another. The plates must meet close tolerances, and the joints between abutting baffle plates must be able to accommodate the thermal expansion. The net result is a design requiring complex, time consuming, and costly manufacturing techniques. Further, some prior art baffle-former assemblies have experienced leakage through gaps formed between adjacent baffle plates, which leakage impinges upon the fuel assemblies and may cause detrimental assembly vibration.

Fourth, the amount of reactor coolant flow which is passed through the baffle-former annular region to cool the components must be carefully controlled. An excessive amount of this flow will significantly detract from the reactor thermal efficiency, as this fluid is mixed with hot fluid exiting the core. Similarly, the amount of coolant flow between the outermost fuel assemblies and the baffle must not be excessive.

Fifth, the baffle plates and formers are typically of a material such as stainless steel. Stainless steel is a parasitic neutron absorber, and therefore also a poor neutron reflector, which further results in decreased reactor efficiency. Also, because of the orientation of the baffle plates, they may exhibit a tendency to bow, thereby changing the flow baffling characteristics and potentially contacting the peripheral fuel rods, which would cause local flow starvation and excessively high fuel rod temperatures.

Some of these concerns have been addressed in U.S. Pat. No. 3,607,637, issued Sept. 21, 1971, to Robert C. Marshall, hereinafter referred to as the Marshall patent. The Marshall patent provides a nuclear reactor including a plurality of seal plates fastened to a fluid confining means surrounding the core, such as a core barrel, and having the inner edges of the plates adjacent, but spaced from, the outer fuel elements of the core. The plates are longitudinally positioned at substantially evenly spaced locations intermediate the ends of the core. The patent also contemplates the use of neutron reflectors vertically mounted on the seal plates. The Marshall patent, therefore, alleviates many of the above problems by elimination of the baffle (referred to as a "shroud" in that patent).

However, there remain concerns with the arrangement as provided in the Marshall patent. The most significant is that there remains the potential for contact of the seal plates (referred to as baffle plates throughout this application), with the peripheral fuel rods. Such contact of a seal plate and a heat generating fuel rod for a long duration could result in flow starvation, excessive localized heating, and fretting of the rod, potentially resulting in rod failure. Further, it is well recognized that under irradiation fuel rods may bow and are also subject to vibration in the high velocity coolant stream. Therefore, there may be intermittent contact among the outermost fuel rods and the seal plates, potentially resulting in increased fretting or even rupture of the rods. Merely spacing the edges of the seal plates farther from the core could alleviate this, but such an arrangement would compromise the flow control, allowing excessive coolant to bypass the core region.

Also, spacing of the seal plates at substantially even increments along the core length is likely not to be the best arrangement from a thermal-hydraulic standpoint. Coolant flow through a core is subject to varying conditions along the assembly length. Most notably, the pressure drop is significant as the coolant flows about and through the assemblies, resulting in a lower pressure at the core outlet. Further, and of great significance in those reactors with fuel assemblies including a plurality of fuel rods laterally supported by grid structures, is the localized effect of the coolant flow as it approaches and passes about a fuel assembly grid structure location. The grid location presents a significant resistance to flow and therefore a large pressure drop. The flow will therefore tend to discharge radially as it approaches a grid. With a mismatch in the elevations of the grids and the elevations of the seal plates of the Marshall patent, such as a grid located between two seal plates, excessive lateral and vortex flow may be experienced in the volume between the consecutive seal plates. This could detrimentally cause flow starvation at the fuel assembly due to the lateral flow component and increased asembly vibration and fretting.

It is therefore desirable to provide an arrangement which overcomes the stated deficiencies of the prior art and the Marshall patent. Such an arrangement should still meet the main functional criteria of baffling flow into and properly about the core, as well as maintaining an acceptably low volume of bypass flow.

SUMMARY OF THE INVENTION

This invention provides a flow baffling arrangement for the core of a nuclear reactor that overcomes the structural and other deficiencies of prior art baffling arrangements. Through utilization of the invention, the large flow baffle plates typically surrounding a core may be eliminated while maintaining proper flow control.

The invention is based upon the principle that the regions of high pressure drop and flow resistance in the baffling area surrounding the core are placed at about the same elevations as the regions of high pressure drop and flow resistance through the core. More specifically, formers are positioned at about the same elevations as the fuel assembly grids. Thus reactor coolant flow is baffled through and about the core assemblies, while a minimum amount of flow is permitted to bypass the energy producing core. In the main embodiment, the formers themselves extend from flow control and core support means surrounding the core, such as a core barrel, toward the grids of the peripheral fuel assemblies. In other embodiments, baffle plates, which are relatively small and simple to support as compared to the prior art, are positioned between the formers and the grids. Other embodiments include neutron reflector plates positioned between consecutive formers, to increase core efficiency. And yet another embodiment provides the addition of sealing springs extending from the formers into contact with the grids, further alleviating core bypass flow.

BRIEF DESCRIPTION OF THE DRAWINGS

The functions and advantages of this invention will become more apparent from the following description taken in connection with accompanying drawings, in which.

DESCRIPTION OF THE PREFERRED EMBODIMENTS

Figure 1:
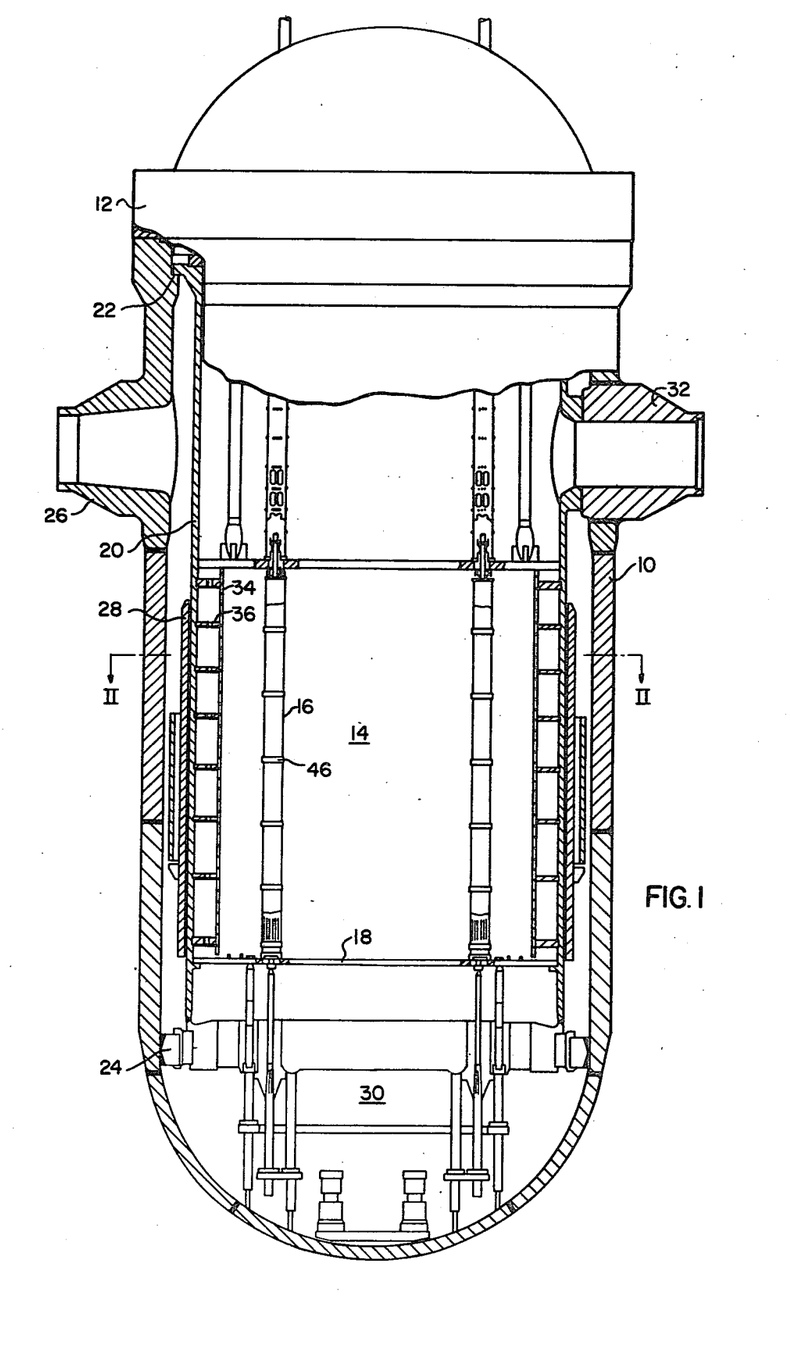
FIG. 1 is a simplified elevation view, in section, of a typical nuclear reactor vessel and the reactor vessel internals.
Figure 2:
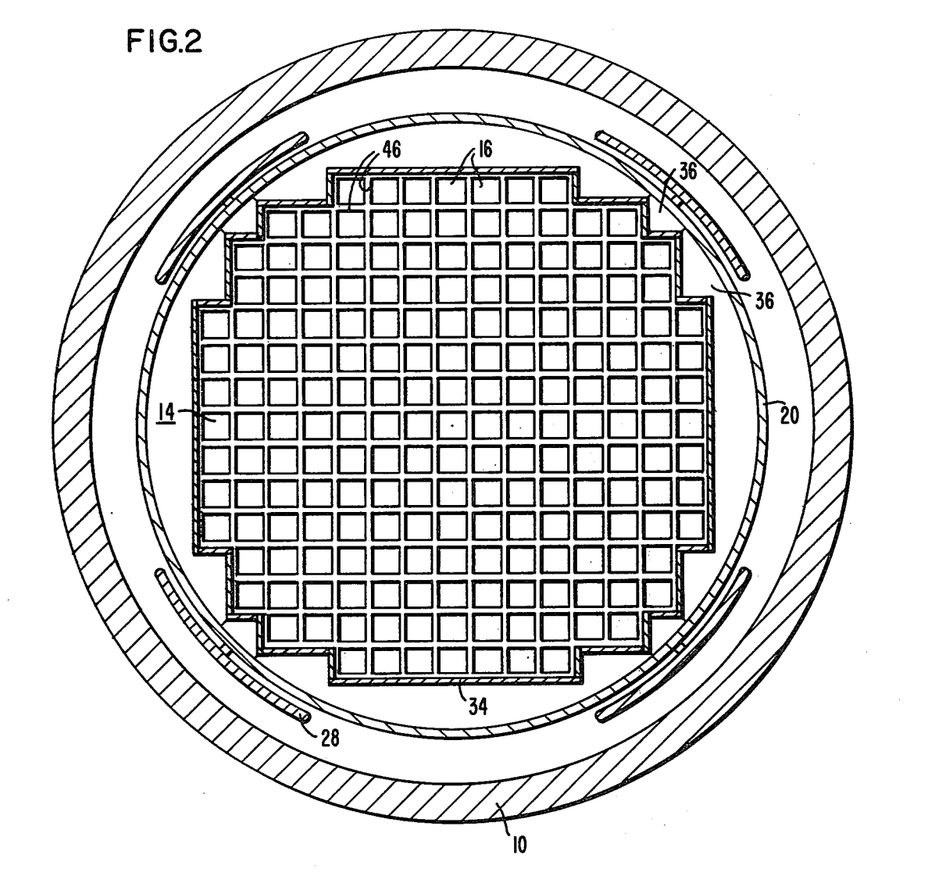
FIG. 2 is a plan view, in section, taken at II—II of FIG. 1.

Referring now to the drawings, there is shown in FIGS. 1 and 2 a typical nuclear reactor vessel 10 including the vessel head 12. The vessel 10 encloses a reactor core 14 which includes a plurality of elongated fuel assemblies 16 oriented adjacent one another. The assemblies 16 are supported by a lower core plate 18 which is perforated to allow passage of coolant and which in turn is supported by a core barrel 20. The core barrel 20 is supported from a ledge 22 of the reactor vessel 10, and is restrained in lateral movement by a radial support system 24 affixed to the vessel 10. The main flow of reactor coolant fluid typically enters the vessel 10 through one or more inlet nozzles 26, passes downward about the outer periphery of the core barrel 20 and about the affixed neutron shields 28, is turned one hundred and eighty degrees in a lower plenum 30, passes upward through the lower core plate 18 and core 14, and exits through outlet nozzles 32.

It is of prime importance that the flow of coolant is carefully controlled into and about the fuel assemblies 16 of the core 14. Baffling of coolant flow about the core 14 has typically been performed by a baffle plates 34 and formers 36 assembly, through which a small bypass flow of reactor coolant is also passed. This bypass flow must be minimized since it decreases the thermal efficiency of the reactor, but must be large enough to adequately cool the surrounding components. This flow experiences a pressure drop as it passes through the region, the major portion of which occurs at each former 36 elevation.

Figure 3:
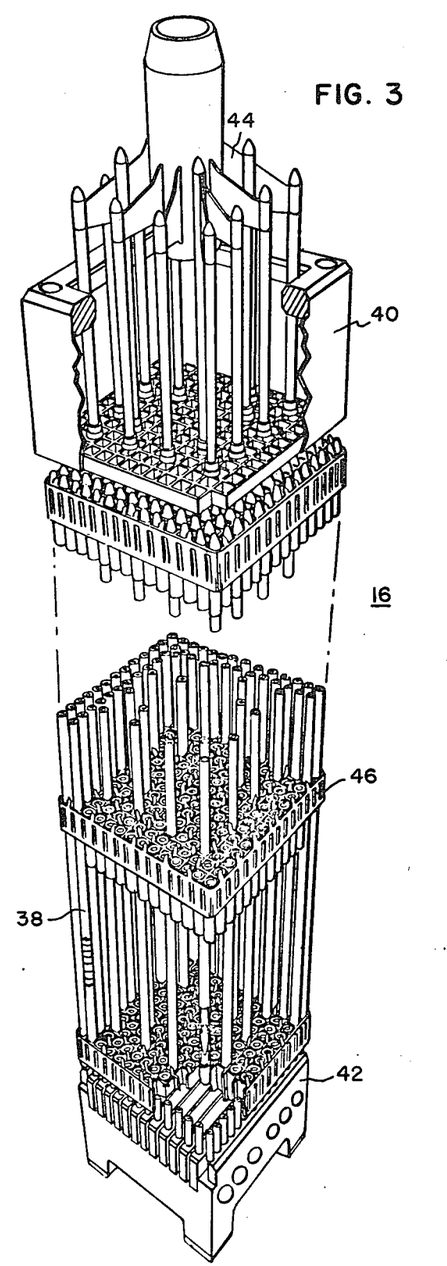
FIG. 3 is an isometric view of a typical nuclear fuel assembly.

In order to also minimize bypass flow between the outermost fuel assemblies 16, which are typically operating at a lower power density than more central assemblies, and the baffle plates 34, the plates 34 are oriented close to the assemblies 16. A typical fuel assembly 16 is shown in FIG. 3, and includes a plurality of nuclear fuel rods 38 bounded by an upper 40 and a lower nozzle 41. Shown removably inserted within the assembly is a control rod element 44. Spaced along the assembly 16 length are a plurality of grid structures 46 which provide lateral support of the fuel rods 38 while allowing axial growth. Grids 46 of assemblies 16 within a given core are positioned at the same elevations and also serve as the contact points among adjacent assemblies 16. As reactor coolant passes through and along an assembly, it experiences a pressure drop, most particularly at the grid 46 elevations.

Figure 4:
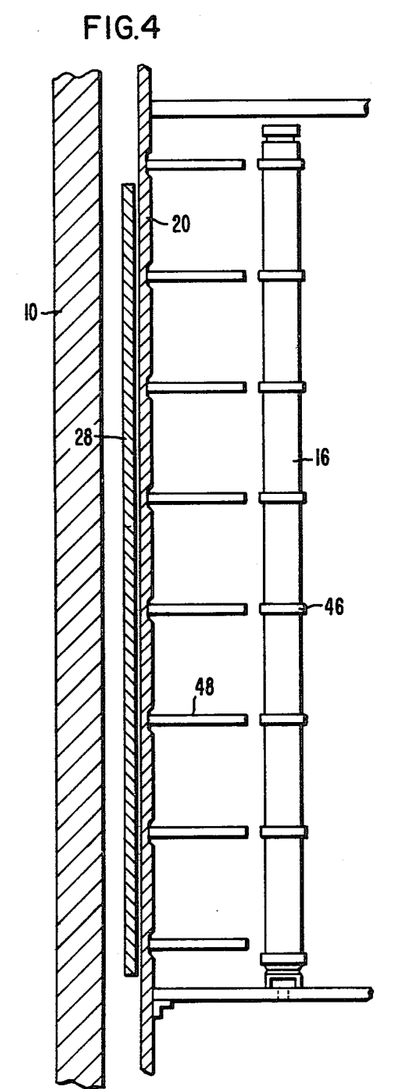
FIG. 4 is an elevation view showing the preferred orientation of formers adjacent a fuel assembly.
Figure 5:
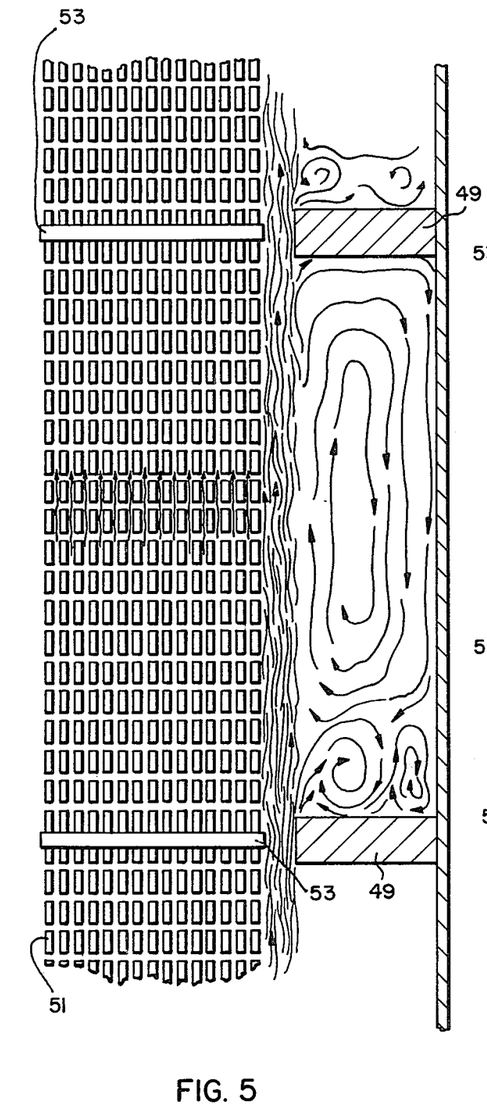
FIG. 5 is a schematic illustration of water table tests simulating the embodiment of FIG. 4.
Figure 6:
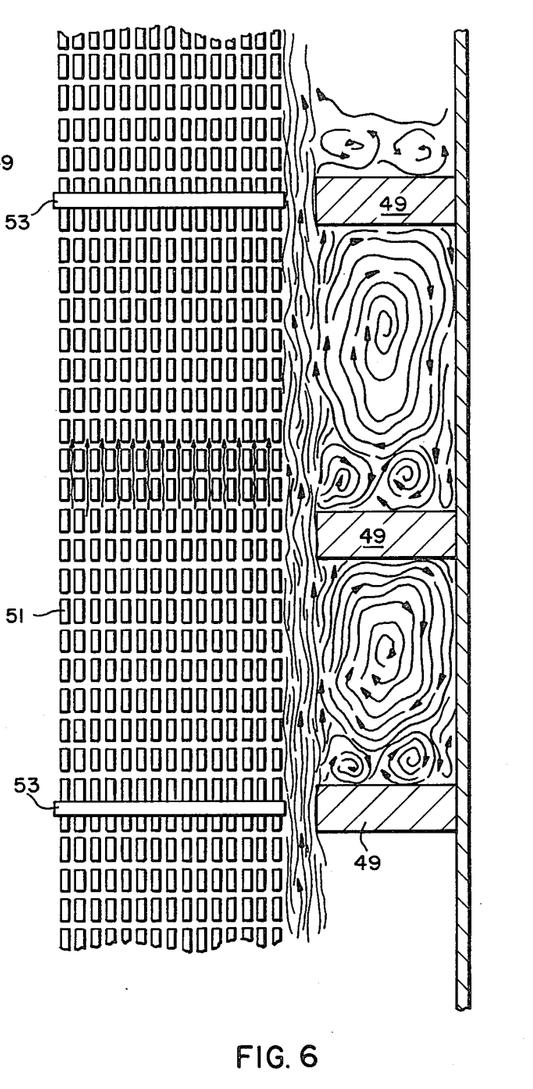
FIG. 6 is an illustration similar to FIG. 5, showing the effect of an additional former upon fluid flow.

This invention, a preferred embodiment of which is shown in FIG. 4, utilizes the flow resistance phenomenon at the grid 46 elevations to assist in flow baffling control. It has been found that coolant flow can be controlled, even with elimination of the baffle plates, by orientation of formers 48 at about the grid 46 elevations. The formers 48 are affixed to the core barrel 20, and extend toward the respective grid 46. This arrangement places the areas of high flow resistance at the same elevations, with the result that the flow of coolant is primarily vertical, with only small amounts of vortex flow between consecutive formers 48. If the formers 48 and grids 46 are not at about the same elevations, large undesirable vortex and cross flows would result. Excessive cross flows can result in undesirable vibration of the assemblies 16. In this embodiment, the formers are preferably extended to within one-tenth of an inch of the peripheral fuel assembly grids 46, and are within about one inch of the grid elevation. The effect of such an arrangement is shown in FIG. 5, which is an illustration of the results of water table tests which simulated the invention. A sufficient amount of coolant flows in the area between the test formers 49, while the main stream passes vertically. The test apparatus also includes a test assembly 51 with test grids 53. The total amount of the peripheral flow in a reactor is preferably about one-half percent of the total coolant flow, and should not exceed two percent to maintain an acceptable thermal efficiency. In a similar test, illustrated in FIG. 6, an additional test former 49 was placed between test grid 53 elevations. As shown, the vortex flow was significant, and caused excessive impingement on the test fuel assembly 51.

It should here be noted that, with this invention, if there is former 48 to assembly 16 contact in a core 14, it will occur at the grid 46. The load is thus distributed through the assembly, and not only received locally by a few fuel rods 38. This alleviates the potential for fuel damage as a result of vibration impact, fretting, or local rod overheating.

Figure 7:
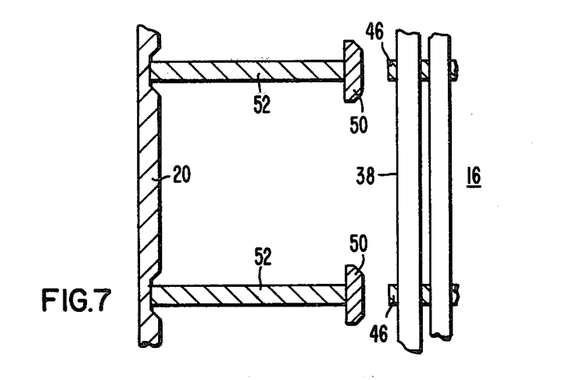
FIG. 7 is a simplified elevation view of former orientation for one of the preferred embodiments of this invention.

In addition to the basic inventive embodiment, maintaining flow baffling control by orientation of the formers 48 at about the grid 46 elevations, alternate embodiments may be utilized to provide additional beneficial functions. FIG. 7 shows an embodiment where intermittent baffle plates 50 are positioned closely adjacent the fuel assembly grids 46 at the edge of formers 52 which are at about the grid elevations. This embodiment not only provides the flow baffling function, but can also be utilized to provide transverse support for peripheral fuel assemblies 16, as the load will be transmitted through the grid 46. The baffle plates 50 in this embodiment are preferably segmented about the core periphery to reduce the differential expansion loadings between the baffles 50 and formers 52. The baffles 50 are preferably positioned to extend over the local upstream and downstream pressure and flow effects of the grids 46.

Figure 8:
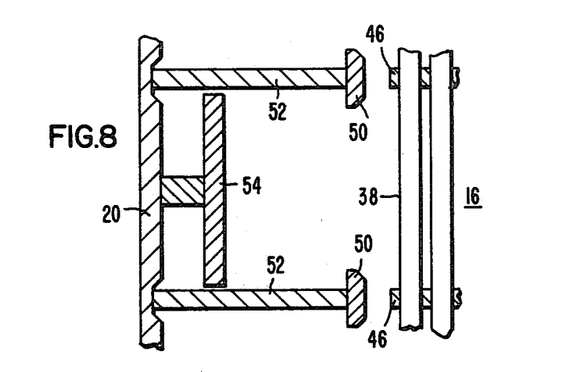
FIG. 8 is another simplified elevation view of former and reflector orientation for a preferred embodiment.

Another embodiment, shown in FIG. 8, includes a non-structural neutron reflector 54 positioned between consecutive formers 52, which may also include the intermittent baffle plates 50. This embodiment may be utilized to improve the nuclear characteristics of the operating core 14 and increase the reactor efficiency. Similar to the baffle plates 50, the reflector 54 may also be segmented about the core periphery. It may also be utilized only at selected peripheral locations, such as the "corners" where the core 14 is closest to the core barrel 20.

Figure 9:
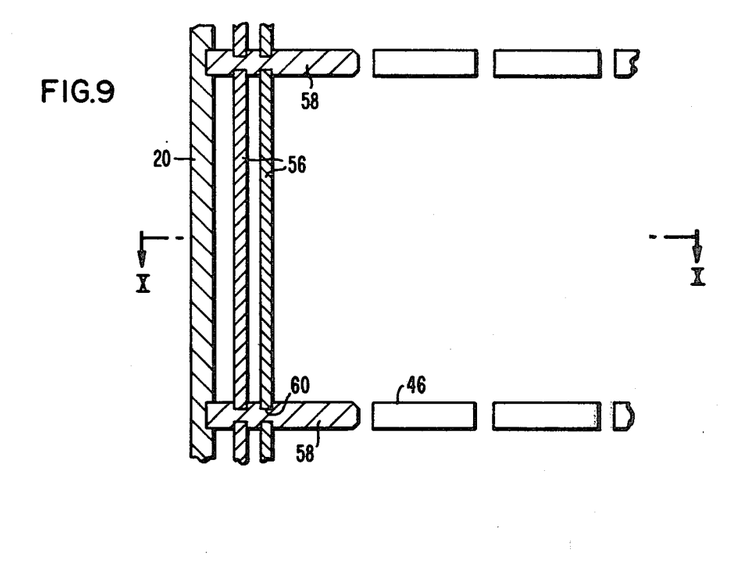
FIG. 9 is yet another simplified elevation view of a preferred former and reflector embodiment of this invention.
Figure 10:
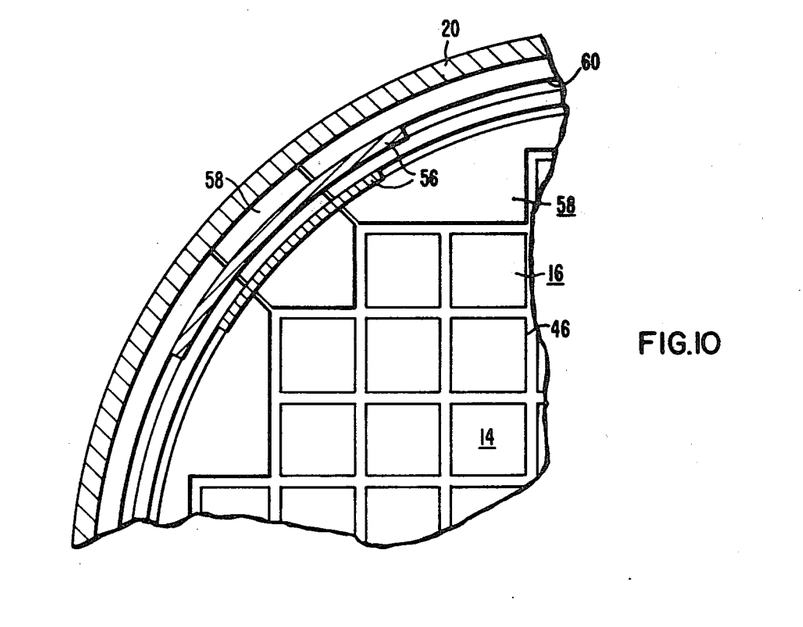
FIG. 10 is a view taken at X—X of FIG. 9.

An ideal neutron reflector starts with a layer of water and alternates layer of metal and water. Another embodiment, incorporating such reflectors 56, is shown in FIGS. 9 and 10. A plurality of reflectors 56 are affixed between consecutive formers 58. The formers 58 may be provided with grooves 60 to receive the reflectors 56. To simplify the manufacturing process the grooves 60 may extend over the entire surface of the formers 58, as shown. They also can be sized specifically to receive the reflectors 56. As discussed above, the reflectors 56 may be utilized only at selected locations, such as the "corners" of the core 14. Also, the reflectors 56 may be utilized only at selected core elevations, such as increased use of reflectors about the core midplane as contrasted with the core upper and lower extremities.

It should here be noted that the inventive embodiments are not inconsistent with orienting flow holes vertically through any of the formers, although they are not necessary. Also, the baffles, if utilized, need not be of the same size and may, for example, be smaller at the upper portion of the core.

Figure 11:
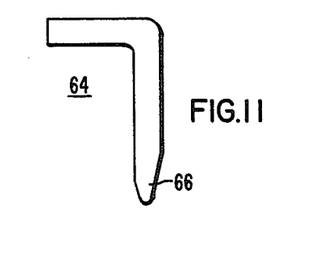
FIG. 11 is a simplified elevation view of a combined baffle and former of this invention.

Further, the affixed baffle plates need not be affixed at their centers to the respective formers. FIG. 11, for example, shows a single piece combined baffle-former 64. To assist in maintaining a proper baffling function of flow through the core 14, the lower portion of the vertical segment may be provided with a leading tapered edge 66 that deflects coolant toward the core 14.

Figure 12:
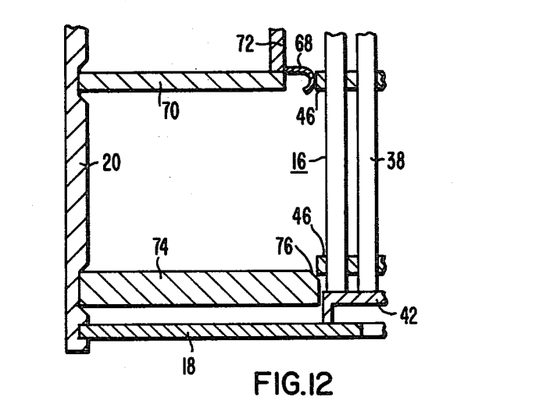
FIG. 12 is yet another simplified elevation view of a preferred embodiment incorporating a sealing spring.

Yet another embodiment is shown in FIG. 12, which shows a fuel assembly 16 seated on the lower core plate 18. This embodiment utilizes sealing means such as a flexible metallic spring 68, to act as a flow baffle. The sealing spring 68, or series of springs, extends across the area between a former 70 and its respective grid 46, and contacts the grid. It therefore maintains a zero gap, minimizing the bypass flow. The sealing spring 68 may be affixed to the former 70 or a reflector 72 if it is utilized. The sealing spring 68 also provides transverse support for the peripheral fuel assemblies 16, and may function to dampen assembly vibrations. The spring may be of varying configurations, but should be sized and shaped only to contact the assembly 16 through the grid, and the contact surface is preferably minimized. Such contact does not raise significant concerns about fuel rod 38 overheating or fretting. Also shown is a former 74 at the lowermost grid 46 elevation. It is sized to be closely adjacent, or abutting against, the fuel assembly lower nozzle 42. It may also include a beveled edge 76 so as not to interfere with the lowermost grid 46. In this embodiment coolant will flow through the perforated lower core plate 18 and up through the core 14 including the peripheral assemblies. The main stream of coolant will flow up through and about these assemblies 16, with a minor portion flowing in the areas between consecutive formers 70 and sealing springs 68, such that no stagnant areas exist.

It will therefore be recognized that utilization of this invention will function to baffle flow through a nuclear reactor core, to provide coolant to the components surrounding the core, and to minimize coolant bypass flow. It alleviates the problems associated with prior art baffling arrangements, and is compatible with many desirable alternative arrangements and additional functions. It will also be apparent that many modifications and variations are possible in view of the above teachings. It therefore is to be understood that within the scope of the appended claims, the invention may be practiced other than as specifically described.

I claim:

1. Apparatus for guiding reactor coolant fluid about and through the core of a nuclear reactor, said core including a plurality of elongated, vertically disposed fuel assemblies each having a plurality of grids positioned at preselected elevations along the assembly length, said apparatus comprising:
   a. a core barrel disposed about and spaced from the radial periphery of said core,
   b. a plurality of horizontally disposed formers affixed to said core barrel at only said preselected grid elevations and extending toward said assemblies, every said grid elevation having a corresponding former, and
   c. flow baffling means affixed to each said former and extending horizontally so as to contact said assemblies, said means comprising a flexible metallic spring sized to contact said assemblies only at said grids.

2. Apparatus for guiding reactor coolant fluid about and through the core of a nuclear reactor, said coolant flowing in a generally upward direction through said core, said core including a plurality of elongated, vertically disposed fuel assemblies each and every having a plurality of grids positioned at preselected elevations along the assembly length, said apparatus comprising:
   a. a core barrel disposed about and spaced from the radial periphery of said core, and
   b. a plurality of combined baffle-former plates, each said plate positioned only at one of said preselected elevations and comprised of a single piece shaped so as to have a horizontal portion affixed at one end to said barrel extending from said barrel toward said core and a vertical portion extending downwardly from the other end of said horizontal portion, said vertical portion having a lower edge tapered such that said upwardly flowing coolant is deflected by said edge toward said core and the respective fuel assembly grid.

* * * * *